(12) United States Patent
Dinkel

(10) Patent No.: US 9,926,768 B2
(45) Date of Patent: Mar. 27, 2018

(54) SLANT-DRILLED VALVE COLLAR

(71) Applicant: TAM INTERNATIONAL, INC., Houston, TX (US)

(72) Inventor: Jeff Dinkel, Houston, TX (US)

(73) Assignee: TAM INTERNATIONAL, INC., Houston, TX (US)

( * ) Notice: Subject to any disclaimer, the term of this patent is extended or adjusted under 35 U.S.C. 154(b) by 523 days.

(21) Appl. No.: 14/551,790

(22) Filed: Nov. 24, 2014

(65) Prior Publication Data
US 2015/0144349 A1    May 28, 2015

Related U.S. Application Data

(60) Provisional application No. 61/908,515, filed on Nov. 25, 2013.

(51) Int. Cl.
*E21B 34/06* (2006.01)
*B23P 15/00* (2006.01)

(52) U.S. Cl.
CPC ............ *E21B 34/06* (2013.01); *B23P 15/001* (2013.01); *Y10T 29/49416* (2015.01)

(58) Field of Classification Search
CPC ........ E21B 34/06; E21B 33/12; E21B 33/127; E21B 33/1272; E21B 23/06; B23P 15/001; Y10T 137/1662; Y10T 137/1669; Y10T 137/1677; Y10T 137/1789; Y10T 29/49419; Y10T 29/49405; Y10T 29/49409; Y10T 29/49426
See application file for complete search history.

(56) References Cited

U.S. PATENT DOCUMENTS

| 3,437,142 | A | 4/1969 | Conover |
| 4,420,159 | A | 12/1983 | Wood |
| 5,024,273 | A | 6/1991 | Coone et al. |
| 5,184,677 | A * | 2/1993 | Dobscha ............. E21B 33/1243 166/183 |
| 6,152,224 | A | 11/2000 | French |
| 7,284,619 | B2 | 10/2007 | Stokley et al. |
| 2013/0061965 | A1 * | 3/2013 | Klaphake ............ F15B 13/0842 137/625.29 |

OTHER PUBLICATIONS

International Search Report and Written Opinion issued in International Application No. PCT/US2014/067120, dated Feb. 2, 2015 (6 pages).

* cited by examiner

*Primary Examiner* — Caroline N Butcher
(74) *Attorney, Agent, or Firm* — Adolph Locklar

(57) ABSTRACT

A valve collar for use with a fluid actuated downhole tool includes a mandrel having one or more valve cylinders formed in the wall thereof, the valve cylinders formed at an angle to the mandrel. The valve cylinders may be connected to each other, to the interior of the mandrel, and to the fluid actuated downhole tool through end holes, slant shell holes, and radial holes. Each valve cylinder may include a valve assembly inserted thereinto.

23 Claims, 9 Drawing Sheets

SLANT-DRILLED VALVE COLLAR

CROSS-REFERENCE TO RELATED APPLICATIONS

This application is a non-provisional application which claims priority from U.S. provisional application No. 61/908,515, filed Nov. 25, 2013, which is incorporated by reference herein in its entirety.

TECHNICAL FIELD/FIELD OF THE DISCLOSURE

The present disclosure relates to valve arrangements for downhole tools.

BACKGROUND OF THE DISCLOSURE

Fluid-energized, or inflatable, packers are isolation devices used in a downhole wellbore to seal the inside of the wellbore or a downhole tubular that rely on elastomeric bladders to expand and form an annular seal when inflated by fluid pressure. Typically, inflatable packers are controlled by packer valves. Various configurations of packer valves have been devised, including two-valve controlled packers in which one valve is used to inflate the packer and the other is used to regulate the maximum pressure applied to the packer.

Current two-valve controlled packers require ports to be drilled from both ends of the tubular segment, thus minimizing the reasonable length valve collars may be manufactured. Due, in part, to the length limitations, current two-valve valve collars are designed to slip over an existing tubular mandrel, where they are coupled, typically by epoxy resin. Such an arrangement may limit the amount of pressure such a valve collar is capable of handling.

SUMMARY

The present disclosure provides for a method of manufacturing a valve collar. The method may include providing a mandrel, the mandrel being a generally tubular body having a first end, and a wall having a thickness; forming a first blind end hole in the first end of the mandrel; forming a first slant shell hole in the mandrel, the slant shell hole located apart from the first end of the mandrel, the first slant shell hole fluidly coupled to the blind end hole, the first slant shell hole defining a first valve cylinder; forming a first radial hole in the mandrel, the radial hole positioned to fluidly couple the first valve cylinder to the interior bore of the mandrel; and inserting a valve assembly into the first valve cylinder.

The present disclosure also provides for a valve collar. The valve collar may include a mandrel, the mandrel being a generally tubular body having a first end, and a wall having a thickness; a first blind end hole formed in the first end of the mandrel; a first slant shell hole formed in the mandrel, the slant shell hole located apart from the first end of the mandrel, the first slant shell hole fluidly coupled to the blind end hole, the first slant shell hole defining a first valve cylinder; and a first radial hole formed in the mandrel, the radial hole positioned to fluidly couple the first valve cylinder to the interior bore of the mandrel.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
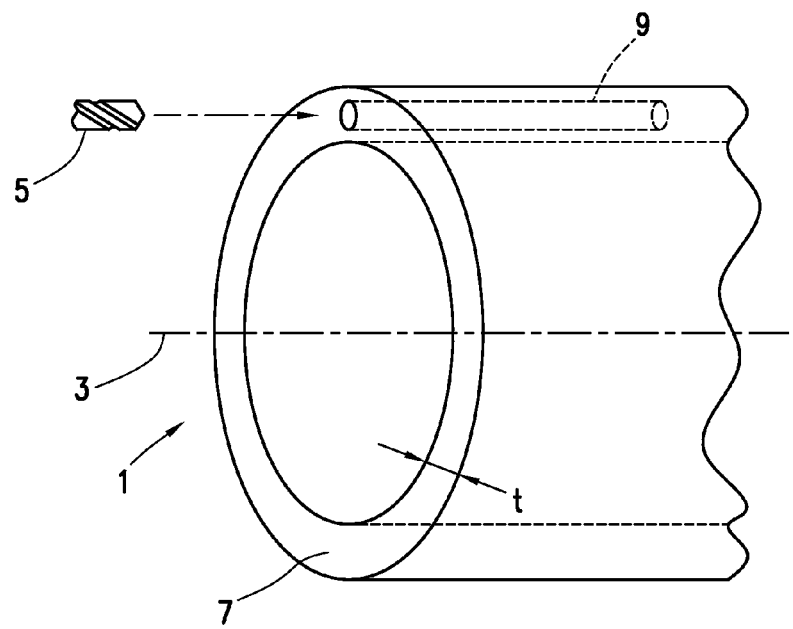
FIGS. 1-4 depict a tubular having different holes drilled thereinto.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure provide for a valve collar useable with a downhole tool. The downhole element may, for example, be an inflatable packer. In other embodiments, a hydraulically actuated shift sleeve may also be used. The valve collar contains a system of chambers and ports and acts as a housing for a valve system for the actuation of the downhole tool. As understood by one having ordinary skill in the art with the benefit of this disclosure, the downhole tool may be any pressure actuated device.

For the sake of clarity, FIGS. 1-4 are provided to explain several hole drilling operations into a tubular body. One having ordinary skill in the art with the benefit of this disclosure will understand that any suitable method for creating a hole may be used without deviating from the scope of this disclosure. FIGS. 1-4 depict a tubular body 1 having longitudinal axis 3. Tubular body 1 is generally cylindrical and includes a wall having a thickness t. A hole drilled into the wall of tubular body 1 may take different forms depending on the direction drill 5 enters tubular body 1 and the depth to which it penetrates. For example, FIG. 1 depicts drill 5 entering on end face 7 of tubular body 1. The resulting hole 9 may thus be characterized as an "end hole" for the purposes of this disclosure. Furthermore, hole 9 runs parallel to longitudinal axis 3 of tubular body 1, and can further be characterized as "longitudinal." As depicted, longitudinal end hole 9 does not penetrate the entire length of tubular body 1. Therefore, as known in the art, longitudinal end hole 9 may further be characterized as a "blind" hole.

Figure 2:
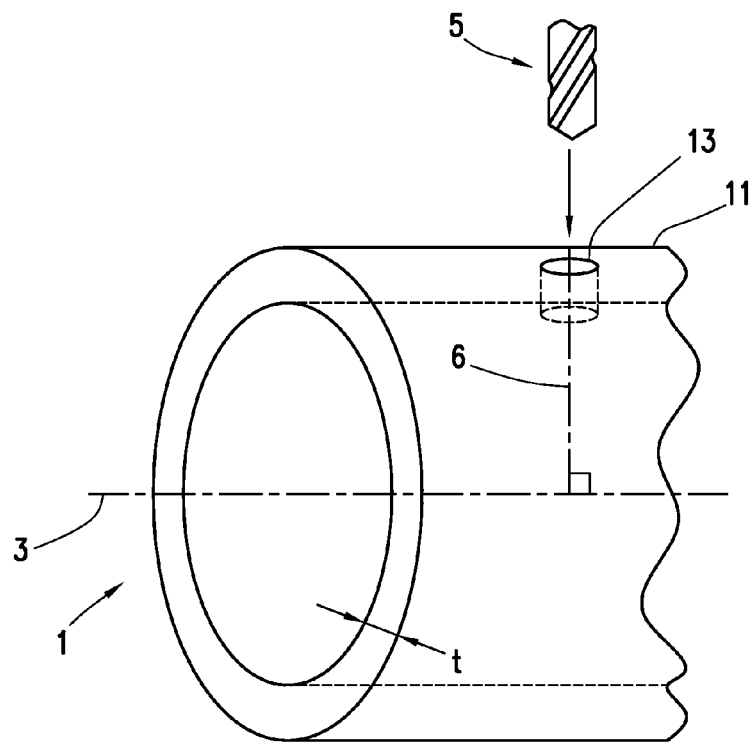

FIG. 2 depicts drill 5 entering on the outer surface 11 of tubular member 1. The axis 6 of drill 5 intersects longitudinal axis 3. Thus, the resulting hole 13 may be characterized as a "radial hole". Such a radial hole may originate from outside of tubular member 1 or from its central bore. Here, radial hole 13 is depicted as passing through the entire sidewall of tubular member 1, and may thus be characterized as a "through" hole.

Figure 3:
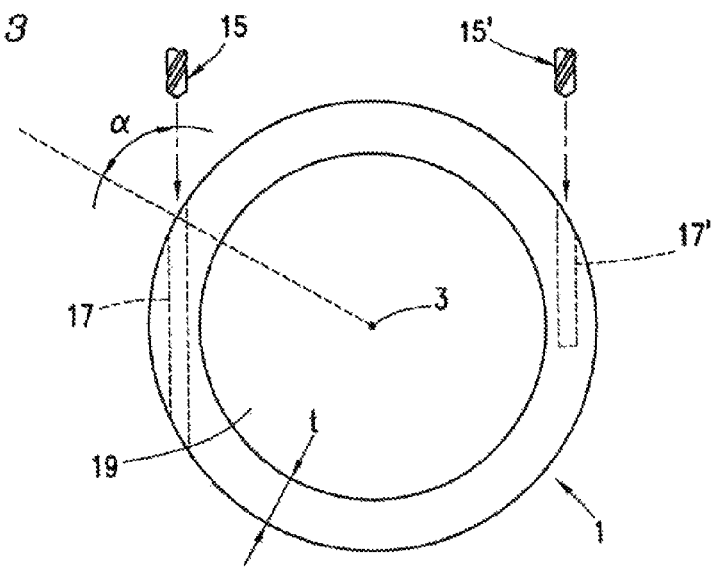

FIG. 3 depicts an end view of tubular member 1. Drill 15 is positioned such that its hole 17 will remain in the side wall of tubular member 1. Such a hole is drilled by drilling at an angle $\alpha$ relative to a radial line normal to the outer surface of tubular member 1. Hole 17 remains in the wall of tubular member 1 and is not open to the central bore 19. Hole 17 may thus be characterized as a "shell" hole. By varying angle $\alpha$, the length of hole 17 may be varied, depending on the diameter of hole 17, the thickness t of the sidewall of tubular member 1 and the radius of tubular member 1. As also depicted in FIG. 3, drill 15' may not penetrate all the way through to exit another point of the sidewall of tubular member 1. Thus, hole 17' may be characterized as "blind".

Figure 4:
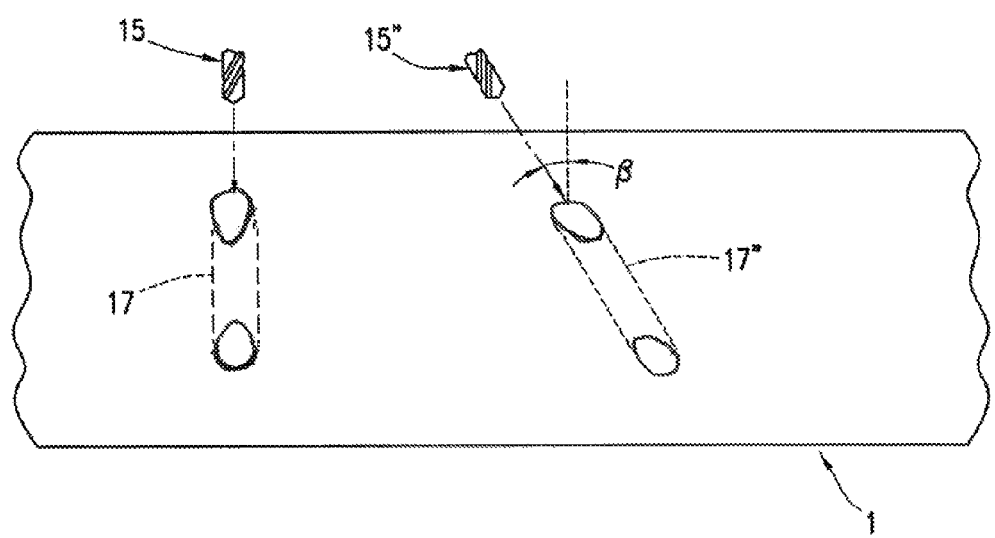

FIG. 4 depicts a side view of the tubular member 1 of FIG. 3. Hole 17 as previously described, enters at one point along the sidewall of tubular member 1 and exits at another, thus being a "through shell hole". Hole 17 is drilled parallel with a circumference of tubular member 1. If, instead, drill 15" enters sidewall of tubular member 1 at an angle $\beta$ relative to the circumference at its entry, hole 17", while still a shell hole, may be characterized as a "slant shell hole" for the purposes of this disclosure. Again, since hole 17" enters and exits the sidewall of tubular member 1, it may further be characterized as a "through" hole.

Figure 5:
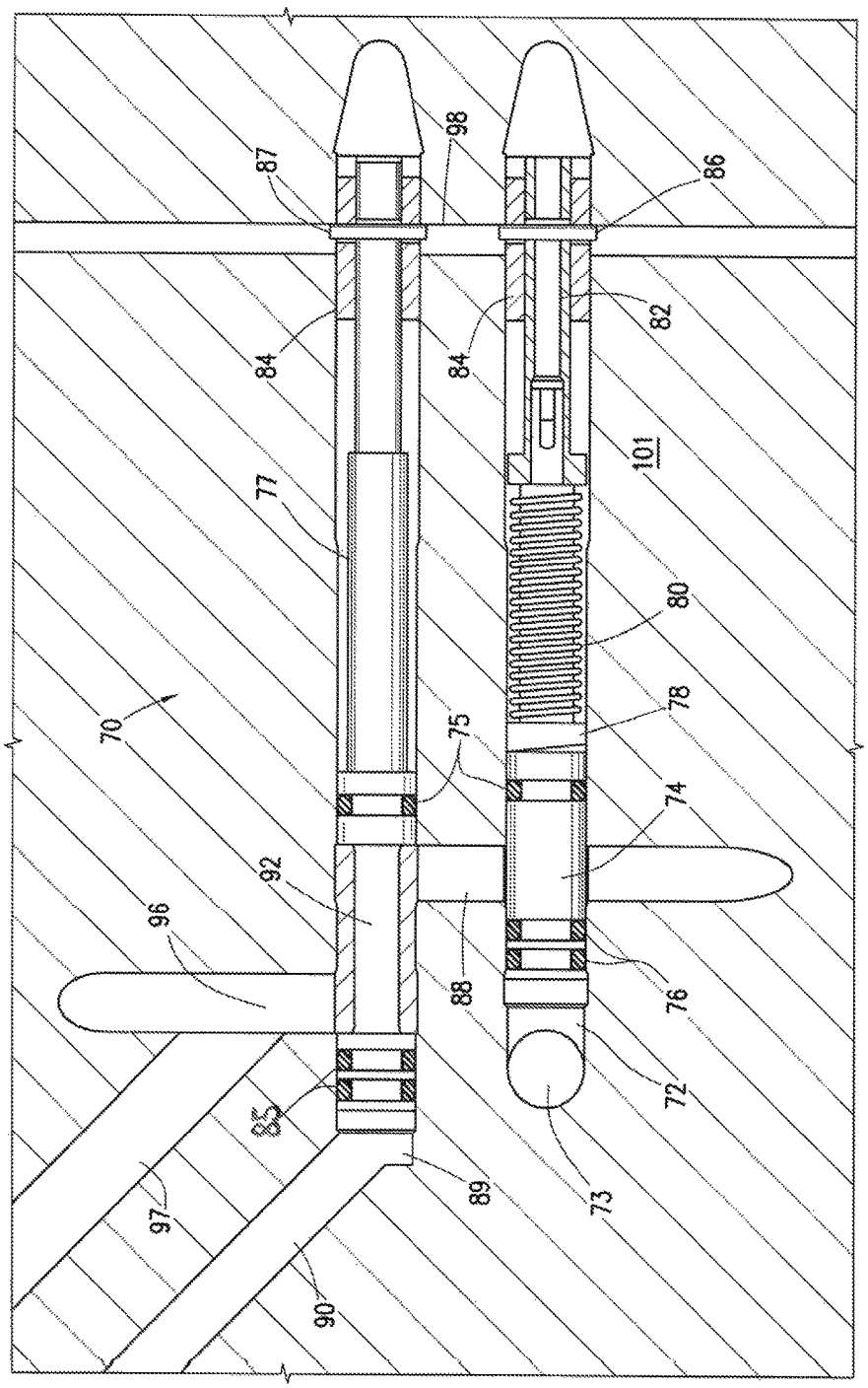
FIG. 5 depicts an opening valve and a closing valve for a packer valve collar consistent with at least one embodiment of the present disclosure.
Figure 6:
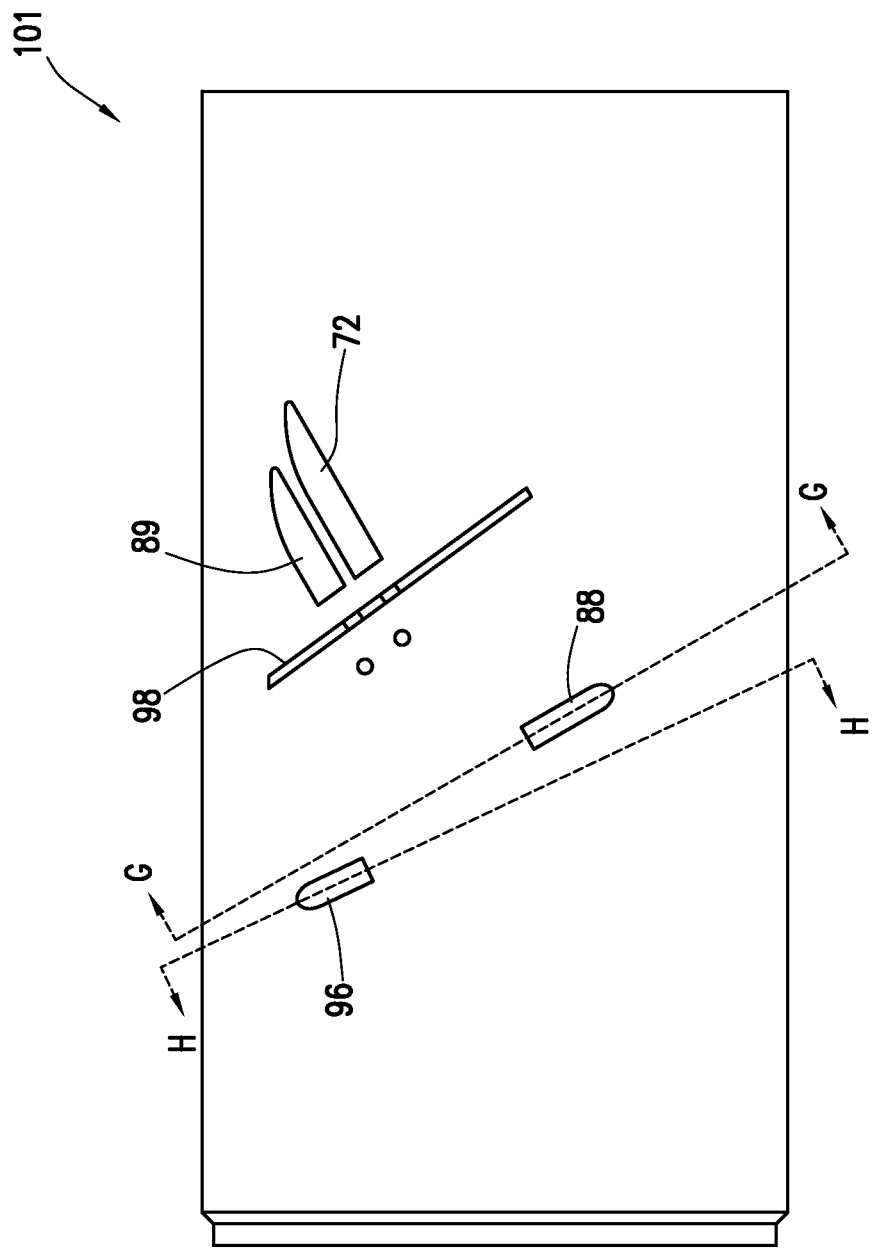
FIG. 6 is an elevation view of a valve collar consistent with at least one embodiment of the present disclosure.
Figure 7:
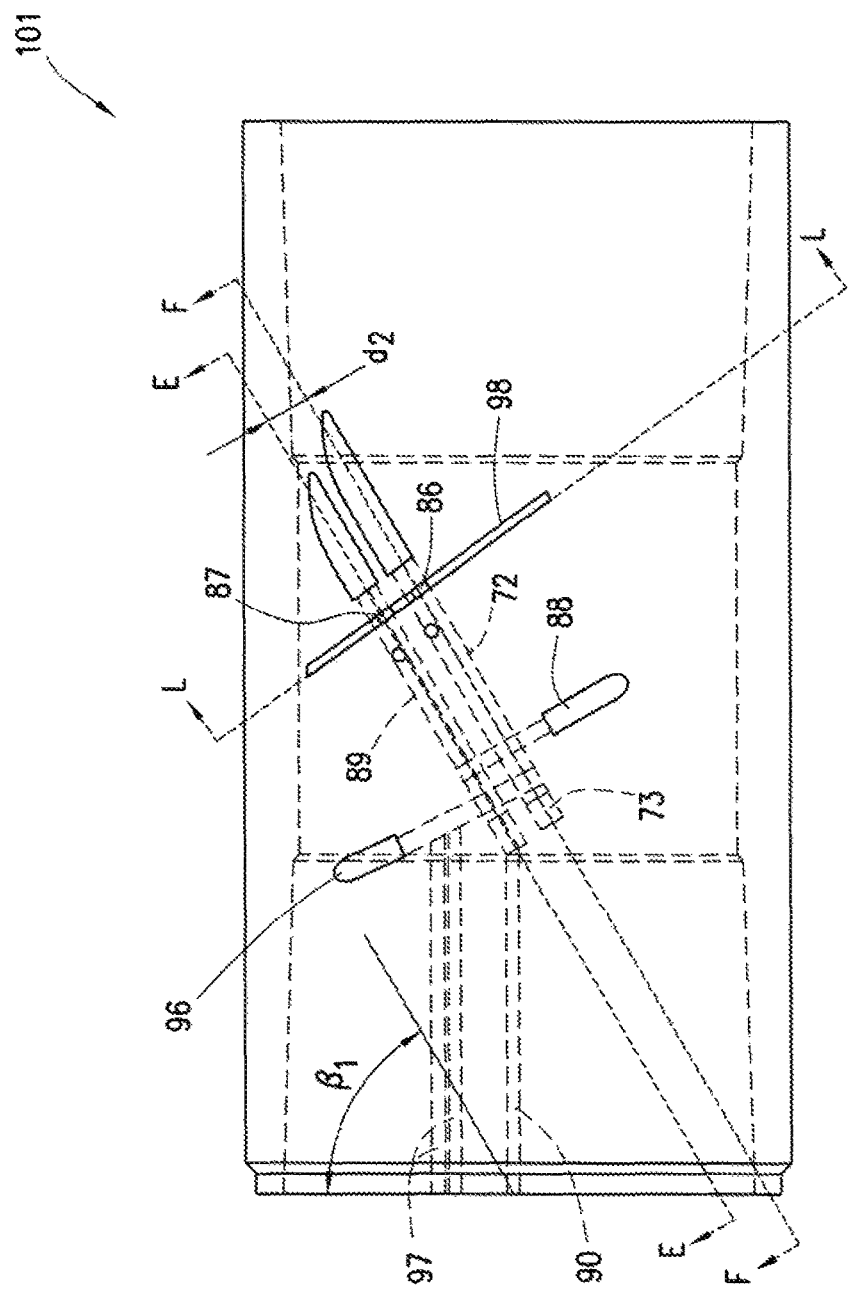
FIG. 7 is a partially transparent view of the valve collar of FIG. 5.

In some embodiments, the valve collar of the present disclosure is adapted for use as a valve collar for an inflatable packer. FIG. 5 depicts one such valve system 70. Fluid in opening cylinder 72 which is in fluid communication with the bore of valve collar 101 through valve port 73, acts on locking piston 74, which is sealed to opening cylinder 72 by seals 76. The opening valve piston 74 (depicted in FIG. 5 in its run-in position) blocks fluid from passing to the inflatable packer (not shown). As pressure is increased in opening cylinder 72, opening valve piston 74 moves downward, shearing shear pin 86—located in shear pin slot 98—between end 6 plug 84 and shear sleeve 82, so that seals 76 pass below connecting port 88, compressing spring 80 on lock rod 78 and moving shear sleeve 82 downward. In this position, fluid may thus flow from opening cylinder 72 to connecting port 88, output port 96, and then to opening port 97 to inflate the packer.

Once the packer is properly inflated, the pressure differential between closing cylinder 89, which is in fluid communication with closing port 90, and the pressure acting on shear sleeve 77 shears shear pin 87—located in shear pin slot 98—so that seals 85 move downward past inflation port 96, thereby closing off flow in connecting port 88 to output port 96. Closing valve 92 and seal 85 may thus be moved to a valve closed position for closing off flow to the packer element. At this stage, the packer is fully inflated or set. By bleeding the applied pressure from the casing ID, opening valve piston 74 moves back to its original position and permanently locks in the closed position by an outward cant of lock rod 78. Valve port 73, opening cylinder 72, connecting port 88, output port 96, opening port 97, closing cylinder 89, closing port 90, and shear pin slot 98 may be formed by drilling holes into generally tubular valve collar 101.

Figure 8:
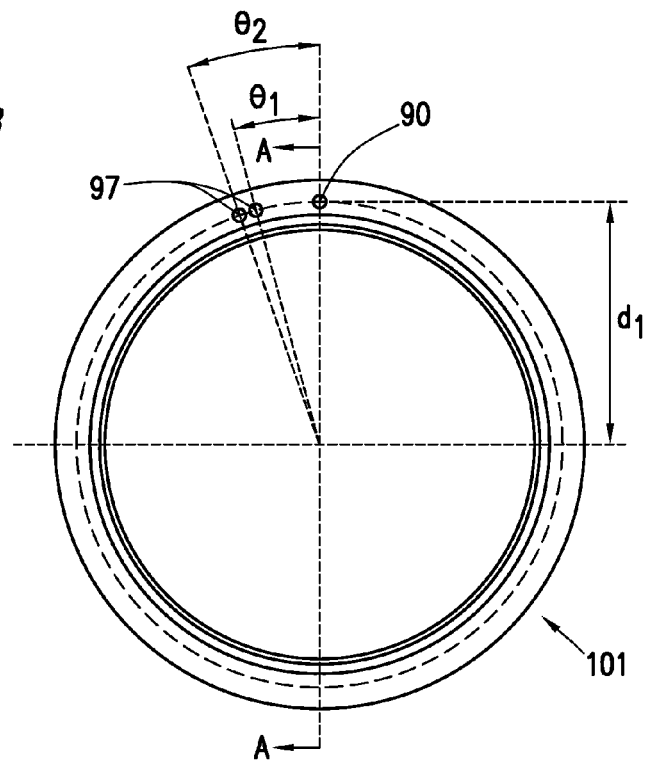
FIG. 8 is an elevation view of the end of the valve collar of FIG. 5.
Figure 9:
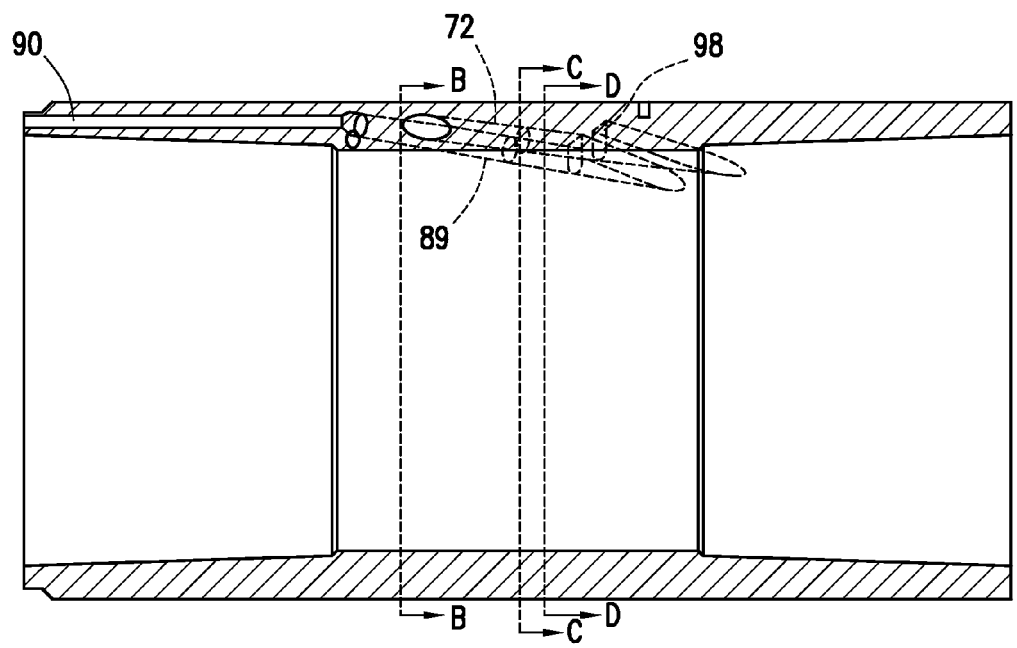
FIG. 9 is a cross-section view of the valve collar of FIG. 7 along line A-A.

FIGS. 6-12 depict one such arrangement of ports for valve system 70 described above. Opening port 97 and closing port 90 are formed as blind, longitudinal end holes drilled in the end of valve collar 101. FIGS. 6-12 depict a valve collar 101 having twin opening ports 97. As depicted in FIG. 8, opening ports 97 and closing port 90 may be drilled at the same radial distance d1 from the center c of valve collar 101. Opening ports 97 may each be separated from closing port 90 by angles $\theta_1$, $\theta_2$. Angles $\theta_1$, $\theta_2$ may depend on the thickness and radius of valve collar 101.

Opening and closing cylinders 72, 89 may be formed as blind, slant shell holes. At its end, closing cylinder 89 intersects and forms fluid communication with closing port 90. Opening and closing cylinders 72, 89 may be drilled at angle $\beta_1$ relative to a circumferential line (here the edge) of valve collar 101. Opening and closing cylinders 72, 89 may be offset from each other by a distance $d_2$. One having ordinary skill in the art with the benefit of this disclosure will understand that opening and closing cylinders 72, 89 may be drilled as through, slant shell holes and include a plug at one or more ends to, for example, seal opening and closing cylinders 72 from a surrounding wellbore. In some embodiments, opening and closing cylinders 72, 89 may be drilled at an angle $\beta_1$ between 30° and 60°. In some embodiments, opening and closing cylinders 72, 89 may be drilled at an angle $\beta_1$ of about 45°. In some embodiments, the angles at which opening and closing cylinders 72, 89 are drilled are selected such that a minimum allowable distance remains between opening and closing cylinders 72, 89 and the inner wall of valve collar 101. As understood in the art, the minimum allowable distance between opening and closing cylinders 72, 89 and the inner wall of valve collar 101 may be determined by the material strength of valve collar 101 and the expected fluid pressure during use. In some embodiments, for example, the minimum allowable distance may be 1/16, 1/8, 1/4 inch or more depending on the material of the valve collar and the expected fluid pressure.

Figure 10A:
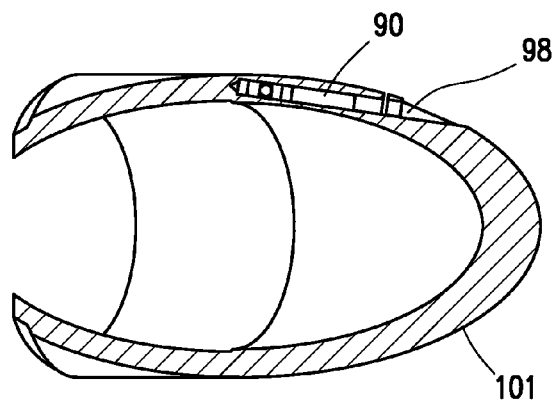
FIGS. 10A-C are cross section views of the valve collar of FIG. 6 along lines E-E, F-F, and L-L respectively.
Figure 10B:
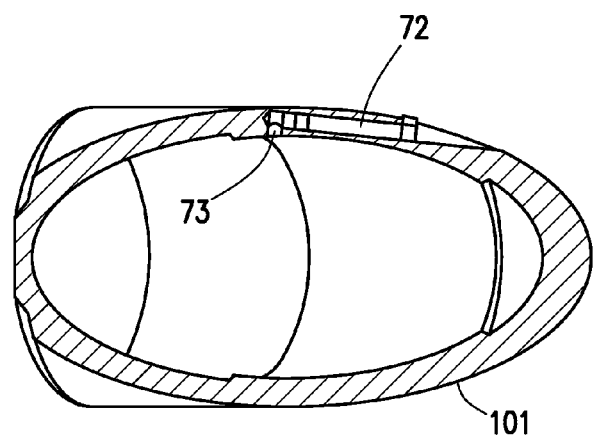
Figure 10C:
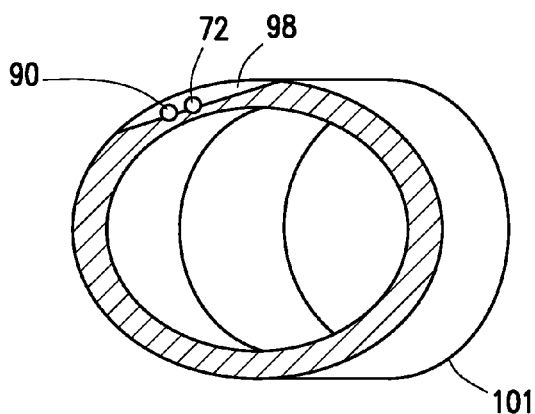
Figure 11A:
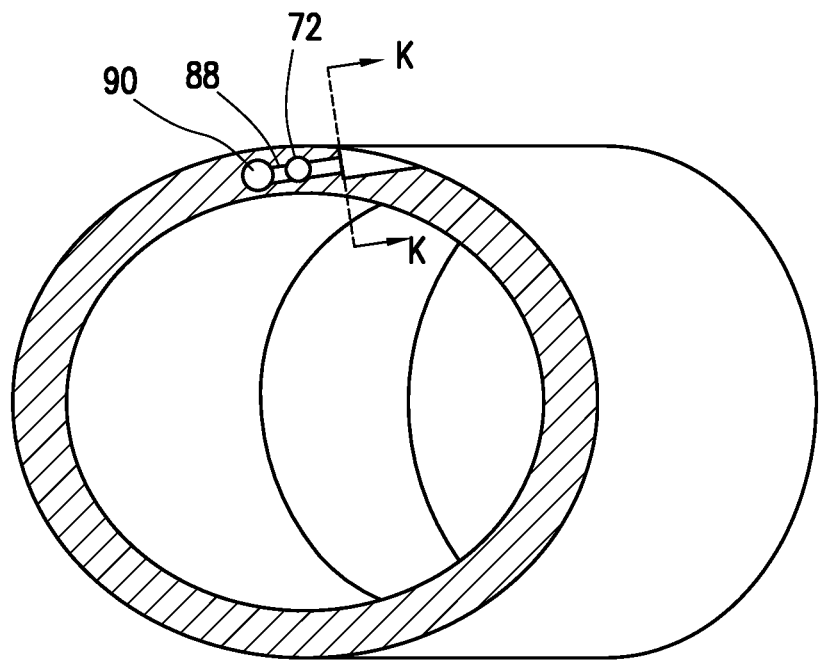
FIGS. 11A-B are cross section views of the valve collar of FIG. 5 along lines G-G and H-H respectively.
Figure 11B:
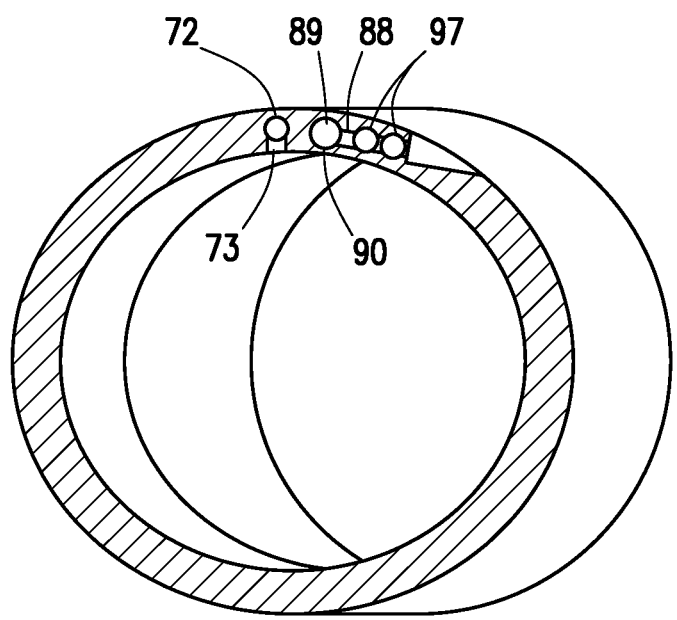
Figure 12A:
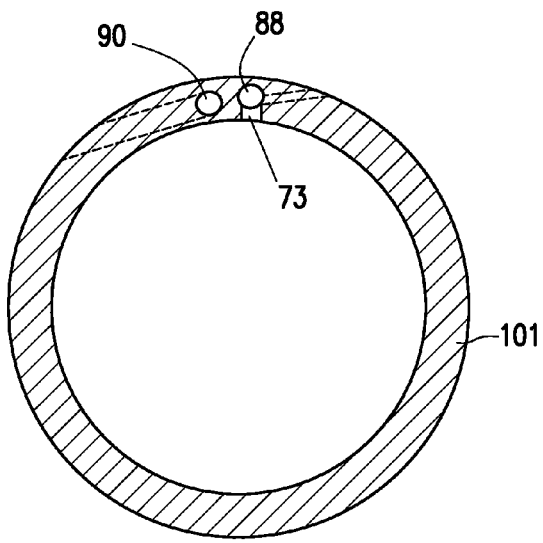
FIGS. 12A-C are cross section views of the valve collar of FIG. 8 along lines B-B, C-C, and D-D respectively.
Figure 12B:
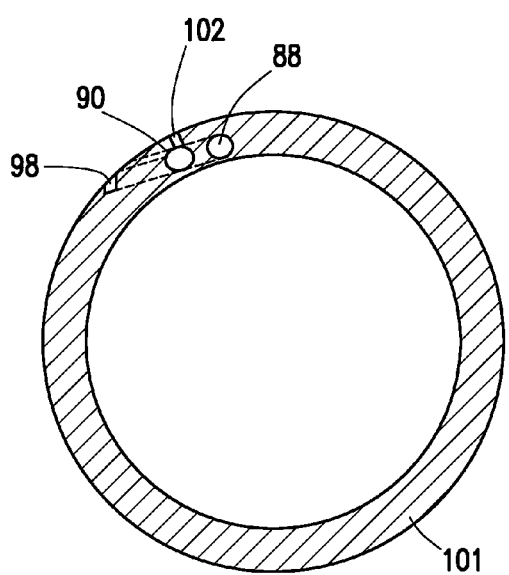
Figure 12C:
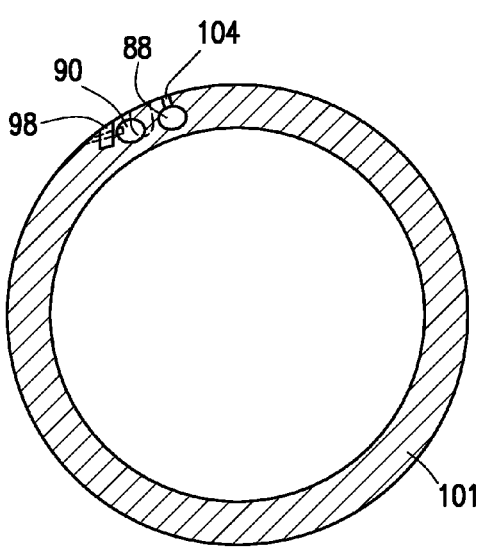

Valve port 73 may be formed as a blind, radial hole formed from the interior of valve collar 101 (FIGS. 10b, 11b, 12a). Valve port 73 is positioned to intersect and form fluid communication between the inner bore of valve collar 101 and opening cylinder 72. One having ordinary skill in the art with the benefit of this disclosure will understand that valve port 73 may be formed as a through, radial hole and include a plug to, for example, seal valve port 73 from a surrounding wellbore.

Output port 96 may be drilled as a shell hole and intersects and forms fluid communication between opening ports 97 and closing cylinder 89. Although here depicted as a blind, slant shell hole orthogonal to closing cylinder 89, one having ordinary skill in the art with the benefit of this disclosure will understand that output port 96 may be drilled as a slant or non-slant shell hole without deviating from the scope of this disclosure. In some embodiments, opening ports 97 may be positioned such that they properly intersect closing cylinder 89, thereby removing the need for output port 96 entirely. Output port 96 may include a plug (not shown) to, for example, seal output port 96 from a surrounding wellbore.

Connecting port 88 may be drilled as a shell hole. Connecting port 88 intersects and forms fluid communication between opening cylinder 72 and closing cylinder 89. Although here depicted as a blind, slant shell hole orthogonal to both opening and closing cylinders 72, 89, one having ordinary skill in the art with the benefit of this disclosure will understand that connecting port 88 may be drilled as a slant or non-slant shell hole without deviating from the scope of this disclosure. Connecting port 88 may include a plug (not shown) to, for example, seal connecting port 88 from a surrounding wellbore.

Shear pin slot 98 may be formed as a slanted groove in the outer surface of valve collar 101. Shear pin slot 98 is positioned such that it intersects opening and closing cylinders 72, 89 so that shear pins 86, 87 may be inserted as previously discussed. One having ordinary skill in the art with the benefit of this disclosure will understand that shear pins 86, 87 may be formed as a single piece, and may, in some embodiments, be formed from a length of wire.

One having ordinary skill in the art with the benefit of this disclosure will understand that opening and closing cylinders 72, 89 may be drilled at any point along valve collar 101. Valve collar 101 may also be any length beyond opening and closing cylinders 72, 89.

One having ordinary skill in the art with the benefit of this disclosure will understand that each of the above mentioned ports may be drilled in any order, and may be drilled at any angle suitable for retaining the entire valve apparatus within the hole. One having ordinary skill in the art with the benefit of this disclosure will also understand that the ports may be of different diameter, include sections having different diameters, and include features such as tapped portions. Additionally, one having ordinary skill in the art with the benefit of this disclosure will understand that the holes may be formed using any drill bit and drilling method, and each hole may be formed by the same or different processes. For example, long holes, such as longitudinal end holes, may be formed by gun drilling, whereas short holes such as radial holes may be formed by milling. Drilling methods may include, without limitation, drilling, milling, trepanning, boring, and gundrilling.

Furthermore, although the valving mechanism described above is consistent with a two-valve packer inflation collar, one having ordinary skill in the art with the benefit of this disclosure will understand that any valving arrangement may be substituted for the valve configuration described herein.

Additionally, one having ordinary skill in the art with the benefit of this disclosure will understand that although two valve cylinders have been described herein, any number of valve cylinders and corresponding additional ports for use in other valve arrangements may be included without deviating from the scope of this disclosure. For example, a packer inflation collar including three or more valves may be substituted without deviating from the scope of this disclosure.

Additionally, although only one end of the valve collar is described as having a valve assembly, one having ordinary skill in the art with the benefit of this disclosure will understand that the other end of the mandrel may have a second valve assembly formed therein which may operate independently and, possibly, simultaneously with the first valve assembly.

To manufacture a slant drilled valve collar consistent with embodiments of the present disclosure, a mandrel is provided. The mandrel is a generally tubular member configured to make up a part of a tool string. The mandrel may have an outer diameter and inner diameter substantially the same as the outer diameter and inner diameter of the tool string to which it will be attached.

One end of the mandrel is drilled with at least one output port, formed as a longitudinal blind hole. At least one shell hole is drilled to intersect the output port. The shell hole may be slant or non-slant. The shell hole may either form a valve cylinder or couple the longitudinal blind hole to a valve cylinder. The valve cylinder is formed as a slant shell hole. Depending on the valving configuration desired, additional longitudinal, shell, and slant shell holes may be drilled. Likewise, other features such as grooves may be formed in the mandrel to, for example, allow shear pins to be positioned into the valve system. At least one radial hole is drilled to couple the inner bore of the mandrel to the output port via the valve system. Valve assemblies are inserted into the valve cylinders in a run-in configuration. In some embodiments, the valves are held in place by threaded connectors such as retaining bolts.

The mandrel is then coupled to a fluid-actuated downhole tool such that the output port is fluidly coupled to an actuation port on the tool. The tool may include, without limitation, an inflatable packer, a hydraulic shift sleeve, etc. The downhole tool may itself include a tool mandrel of substantially the same outer and inner diameter as the mandrel of the valve collar. The valve collar and tool mandrel may include features to facilitate their coupling, such as chamfers, tongues-and-grooves, etc. The valve collar and tool mandrel may be joined by any available means, including, for example, welding.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method of manufacturing a valve collar comprising:
providing a mandrel, the mandrel being a generally tubular body and having a first end, a central bore, and a wall having a thickness;
forming a first blind end hole in the first end of the mandrel;
forming a first slant shell hole in the mandrel, the first slant shell hole entering the wall of the tubular body at an angle relative to a circumference of the mandrel at a point of entry and remaining in the wall of the tubular body and not in communication with the central bore, the first slant shell hole further being located apart from the first end of the mandrel, the first slant shell hole fluidly coupled to the first blind end hole, the first slant shell hole defining a first valve cylinder;
forming a first radial hole in the mandrel, the first radial hole intersecting the first valve cylinder, thereby fluidly coupling the first valve cylinder to the interior bore of the mandrel; and
inserting a valve assembly into the first valve cylinder.

2. The method of claim 1, further comprising:
forming a second slant shell hole, the second slant shell hole located apart from the first slant shell hole, the second slant shell hole defining a second valve cylinder;
forming a first connecting port to fluidly couple the first valve cylinder and the second valve cylinder, the first connecting port being a shell hole or slant shell hole; and
inserting a second valve assembly into the second valve cylinder;

the first radial hole being fluidly coupled to the second valve cylinder via the first valve cylinder and the first connecting port.

3. The method of claim 2, further comprising:
forming a second blind end hole in the first end of the mandrel, the second blind end hole spaced apart from the first blind end hole, the second blind end hole fluidly coupled to the second valve cylinder.

4. The method of claim 3, wherein the valve collar is a two-valve valve collar for an inflatable packer device, the first valve assembly is an opening piston assembly, the second valve assembly is a closing piston assembly, the first blind end hole defines an opening port, the second blind end hole defines a closing port, the opening and closing ports being fluidly coupled to a bladder of an inflatable packer device.

5. The method of claim 4, further comprising:
welding the mandrel to the inflatable packer device.

6. The method of claim 1, further comprising:
tapping a portion of the first valve cylinder so as to create a threaded portion thereof; and
threading a retaining nut into the threaded portion of the first valve cylinder to retain the first valve assembly within the first valve cylinder.

7. The method of claim 1, further comprising:
forming a shear pin groove in an outer surface of the mandrel, the shear pin groove generally perpendicular to the first valve cylinder and intersecting the first valve cylinder; and
inserting a shear pin through the shear pin groove to interface with the first valve assembly.

8. The method of claim 1, wherein the first slant shell hole is drilled at an angle between 30 and 60 degrees relative to a circumference of the mandrel.

9. The method of claim 8, wherein the first slant shell hole is drilled at about a 45 degree angle relative to the circumference of the mandrel.

10. A valve collar comprising:
a mandrel, the mandrel being a generally tubular body having a first end, a central bore, and a wall having a thickness;
a first blind end hole formed in the first end of the mandrel;
a first slant shell hole formed in the mandrel, the first slant shell hole entering the wall of the tubular body at an angle relative to a circumference of the mandrel at a point of entry and remaining in the wall of the tubular body and not in communication with the central bore, the first slant shell hole located apart from the first end of the mandrel, the first slant shell hole fluidly coupled to the first blind end hole, the first slant shell hole defining a first valve cylinder; and
a first radial hole formed in the mandrel, the first radial hole intersecting the first valve cylinder, thereby fluidly coupling the first valve cylinder to the interior bore of the mandrel.

11. The valve collar of claim 10, further comprising a valve assembly inserted into the first valve cylinder.

12. The valve collar of claim 11, wherein the mandrel is welded directly to a mandrel of a hydraulically actuated tool.

13. The valve collar of claim 11, wherein a portion of the first valve cylinder is tapped, the tapped portion of the first valve cylinder positioned to receive a threaded body to retain the first valve assembly within the first valve cylinder.

14. The valve collar of claim 11, further comprising:
a shear pin groove formed in an outer surface of the mandrel, the shear pin groove generally perpendicular to the first valve cylinder and intersecting the first valve cylinder, the shear pin groove positioned such that a shear pin may be inserted into the first valve assembly therethrough from outside the mandrel.

15. The valve collar of claim 10, further comprising:
a second slant shell hole formed in the mandrel, the second slant shell hole located apart from the first slant shell hole, the second slant shell hole defining a second valve cylinder; and
a first connecting port formed in the mandrel, the first connecting port positioned to fluidly couple the first valve cylinder and the second valve cylinder, the first connecting port being a shell hole or slant shell hole;
wherein the first radial hole being fluidly coupled to the second valve cylinder via the first valve cylinder and the first connecting port.

16. The valve collar of claim 15, further comprising a second valve assembly inserted into the second valve cylinder.

17. The valve collar of claim 16, further comprising:
a second blind end hole formed in the first end of the mandrel, the second blind end hole spaced apart from the first blind end hole, the second blind end hole fluidly coupled to the second valve cylinder.

18. The valve collar of claim 17, wherein the valve collar is a two-valve valve collar for an inflatable packer device, the first valve assembly is an opening piston assembly, the second valve assembly is a closing piston assembly, the first blind end hole defines an opening port, the second blind end hole defines a closing port, the opening and closing ports being fluidly coupled to a bladder of an inflatable packer device.

19. The valve collar of claim 15, wherein a portion of the first connecting port is tapped, the tapped portion of the first connecting port positioned to receive a threaded plug to seal the interior of the connecting port from the wellbore.

20. The valve collar of claim 10, wherein each of the holes is formed by drilling, milling, trepanning, boring, or gun-drilling.

21. The valve collar of claim 10, wherein the first slant shell hole is drilled at an angle between 30 and 60 degrees relative to a circumference of the mandrel.

22. The valve collar of claim 21, wherein the first slant shell hole is drilled at about a 45 degree angle relative to the circumference of the mandrel.

23. A valve collar comprising:
a mandrel, the mandrel being a generally tubular body having a first end, a central bore, and a wall having a thickness;
a first blind end hole formed in the first end of the mandrel; a first slant shell hole formed in the mandrel, the first slant shell hole entering the wall of the tubular body at an angle relative to a circumference of the mandrel at a point of entry and remaining in the wall of the tubular body and not in communication with the central bore, the first slant shell hole located apart from the first end of the mandrel, the first slant shell hole fluidly coupled to the first blind end hole, the first slant shell hole defining a first valve cylinder;
a first radial hole formed in the mandrel, the first radial hole intersecting the first valve cylinder, thereby fluidly coupling the first valve cylinder to the interior bore of the mandrel; and
a connecting port, the connecting port formed as a shell hole or slant shell hole in the mandrel, the connecting port positioned to fluidly couple the first blind end hole to the first valve cylinder.

* * * * *